US012715739B2

(12) United States Patent
Martins et al.

(10) Patent No.: US 12,715,739 B2
(45) Date of Patent: Aug. 25, 2026

(54) ELEVATOR CAR CEILING ACCESS SYSTEM

(71) Applicant: Otis Elevator Company, Farmington, CT (US)

(72) Inventors: Antonio Martins, Vernon, CT (US); Yingxin Gao, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/910,757

(22) Filed: Oct. 9, 2024

(65) Prior Publication Data

US 2026/0097929 A1 Apr. 9, 2026

(51) Int. Cl.
*B66B 11/02* (2006.01)
*B66B 5/00* (2006.01)

(52) U.S. Cl.
CPC ........ *B66B 11/0246* (2013.01); *B66B 5/0087* (2013.01)

(58) Field of Classification Search
CPC ............... B66B 11/0206; B66B 5/0087; B66B 11/0226; B66B 11/0246
See application file for complete search history.

(56) References Cited

U.S. PATENT DOCUMENTS 3,191,721 A * 6/1965 Conry ................ B66B 11/0226 187/401
6,202,800 B1 * 3/2001 Muller ................ B66B 11/0246 187/401
6,202,801 B1 * 3/2001 Muller ................ B66B 11/0246 187/401
6,419,052 B1 * 7/2002 Muller ................ B66B 11/0246 187/414
7,261,185 B2 * 8/2007 Strebel .................. B66B 11/022 187/249
7,337,880 B2 * 3/2008 Sittler ................ B66B 11/0246 187/401
9,102,502 B2 * 8/2015 Yamada ................ B66B 11/022
9,777,755 B2 * 10/2017 Lowe ...................... F15B 15/26
2019/0210836 A1 * 7/2019 Blanchard ........... B66B 11/0206
2019/0308848 A1 * 10/2019 Litteral ................. B66B 5/0056

(Continued)

FOREIGN PATENT DOCUMENTS

CN 107187998 A * 9/2017 ......... B66B 11/0246
CN 114249211 A * 3/2022 ............. B66B 13/00
CN 116924193 A * 10/2023 ......... B66B 11/0226

(Continued)

OTHER PUBLICATIONS

European Search Report for application EP 25206497.7, Issued Feb. 18, 2026, 6 pages.

*Primary Examiner* — Minh Truong
*Assistant Examiner* — Michelle M Mudwilder
(74) *Attorney, Agent, or Firm* — CANTOR COLBURN LLP

(57) ABSTRACT

Elevator cars including a movable platform defining an elevator car floor, a ceiling access panel located in a ceiling of the elevator car, and a ceiling panel access system. The ceiling panel access system includes at least one movable support arranged within a vertical frame member and the at least one movable support is connected to the movable platform and arranged to move the movable platform vertically within the elevator car.

17 Claims, 9 Drawing Sheets

(56) References Cited

U.S. PATENT DOCUMENTS

2022/0332545 A1 * 10/2022 Weibel .................. B66B 11/022

FOREIGN PATENT DOCUMENTS

| | | | | | |
|---|---|---|---|---|---|
| DE | 102006023920 | A1 | * | 11/2007 | ......... B66B 11/0246 |
| EP | 0962418 | A2 | * | 12/1999 | ................ B66F 7/08 |
| EP | 1760026 | A1 | * | 3/2007 | ......... B66B 11/0246 |
| JP | 09309677 | A | * | 12/1997 | |
| WO | WO-2004020322 | A1 | * | 3/2004 | ............. B66B 11/02 |
| WO | WO-2004048245 | A1 | * | 6/2004 | ............. B66B 11/02 |

* cited by examiner

ELEVATOR CAR CEILING ACCESS SYSTEM

BACKGROUND

The subject matter disclosed herein generally relates to elevator systems and, more particularly, to elevator access systems and in particular to elevator car ceiling access systems.

Elevator systems require maintenance to be performed on the various components thereof, with some such components located exterior from the interior cab of the elevator car. Such components may be arranged on an exterior structure of the elevator car and/or located within an elevator shaft. To perform maintenance on such components, technicians may be required to gain access to the exterior of the elevator car. In some elevator systems, the elevator cars may be provided with a ceiling access panel or similar opening to allow for a technician to access the top of an elevator car from the inside of the elevator car. The ceiling access panels are manually operable and can be difficult to access depending on the size or dimensions of the elevator car. Accordingly, improved access to and operation of ceiling access panels of elevator cars may be advantageous.

SUMMARY

According to some embodiments, elevator cars are provided. The elevator cars include a movable platform defining an elevator car floor, a ceiling access panel located in a ceiling of the elevator car, and a ceiling panel access system. The ceiling access panel includes at least one movable support arranged within a vertical frame member and the at least one movable support is connected to the movable platform and arranged to move the movable platform vertically within the elevator car.

In addition to one or more of the features described above, or as an alternative, further embodiments of the elevator cars may include that the at least one movable support is four movable supports.

In addition to one or more of the features described above, or as an alternative, further embodiments of the elevator cars may include that the at least one movable support includes a support body, a set of wheels attached to the support body, and a support bracket configured to connect the movable platform to the support body.

In addition to one or more of the features described above, or as an alternative, further embodiments of the elevator cars may include that the vertical frame member comprises one or more locking apertures and the at least one movable support comprises a locking wedge configured to selectively engage with the one or more locking apertures.

In addition to one or more of the features described above, or as an alternative, further embodiments of the elevator cars may include that the one or more locking apertures are arranged to define at least a maximum vertical position of the movable platform within the elevator car and at least one intermediate position that is at a lower vertical position than the maximum vertical position.

In addition to one or more of the features described above, or as an alternative, further embodiments of the elevator cars may include a driving mechanism configured to drive movement of the movable platform between a normal operating position wherein the movable platform defines the floor of the elevator car and a maximum vertical position wherein a person standing on the movable platform in the maximum vertical position can access a top of the elevator car.

In addition to one or more of the features described above, or as an alternative, further embodiments of the elevator cars may include that the driving mechanism is operably connected to the at least one movable support via a cable.

In addition to one or more of the features described above, or as an alternative, further embodiments of the elevator cars may include that the driving mechanism is mounted to an exterior of the elevator car.

In addition to one or more of the features described above, or as an alternative, further embodiments of the elevator cars may include that the driving mechanism is mounted to a side of the elevator car.

In addition to one or more of the features described above, or as an alternative, further embodiments of the elevator cars may include that the driving mechanism is mounted to a bottom of the elevator car.

In addition to one or more of the features described above, or as an alternative, further embodiments of the elevator cars may include that the driving mechanism is configured to be manually operated.

In addition to one or more of the features described above, or as an alternative, further embodiments of the elevator cars may include that the driving mechanism comprises a motor.

In addition to one or more of the features described above, or as an alternative, further embodiments of the elevator cars may include that the driving mechanism is configured to be operated via a car operating panel of the elevator car.

In addition to one or more of the features described above, or as an alternative, further embodiments of the elevator cars may include that the ceiling panel access system comprises four movable supports arranged in four respective vertical frame members, and wherein the driving mechanism is configured to cause simultaneous movement of the four movable supports within the respective vertical frame members.

In addition to one or more of the features described above, or as an alternative, further embodiments of the elevator cars may include a removable frame cover configured to cover the vertical frame member.

In addition to one or more of the features described above, or as an alternative, further embodiments of the elevator cars may include that the removable frame cover defines a lower frame cover covering a lower portion of the vertical frame member and an upper frame cover is arranged to cover an upper portion of the vertical frame member.

In addition to one or more of the features described above, or as an alternative, further embodiments of the elevator cars may include that the upper frame cover defines a stop to prevent vertical movement of the movable platform beyond a maximum vertical position defined by a lower end of the upper frame cover.

In addition to one or more of the features described above, or as an alternative, further embodiments of the elevator cars may include that the movable platform is supported in a cantilevered manner by the at least one movable support.

In addition to one or more of the features described above, or as an alternative, further embodiments of the elevator cars may include that the movable platform is movable from a normal operating position wherein the movable platform defines the floor of the elevator car, an intermediate position wherein a user can reach and open the ceiling access panel, and a maximum vertical position wherein a person standing on the movable platform in the maximum vertical position can access a top of the elevator car.

In addition to one or more of the features described above, or as an alternative, further embodiments of the elevator cars may include that the vertical frame member defines a channel along which the at least one movable support travels.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
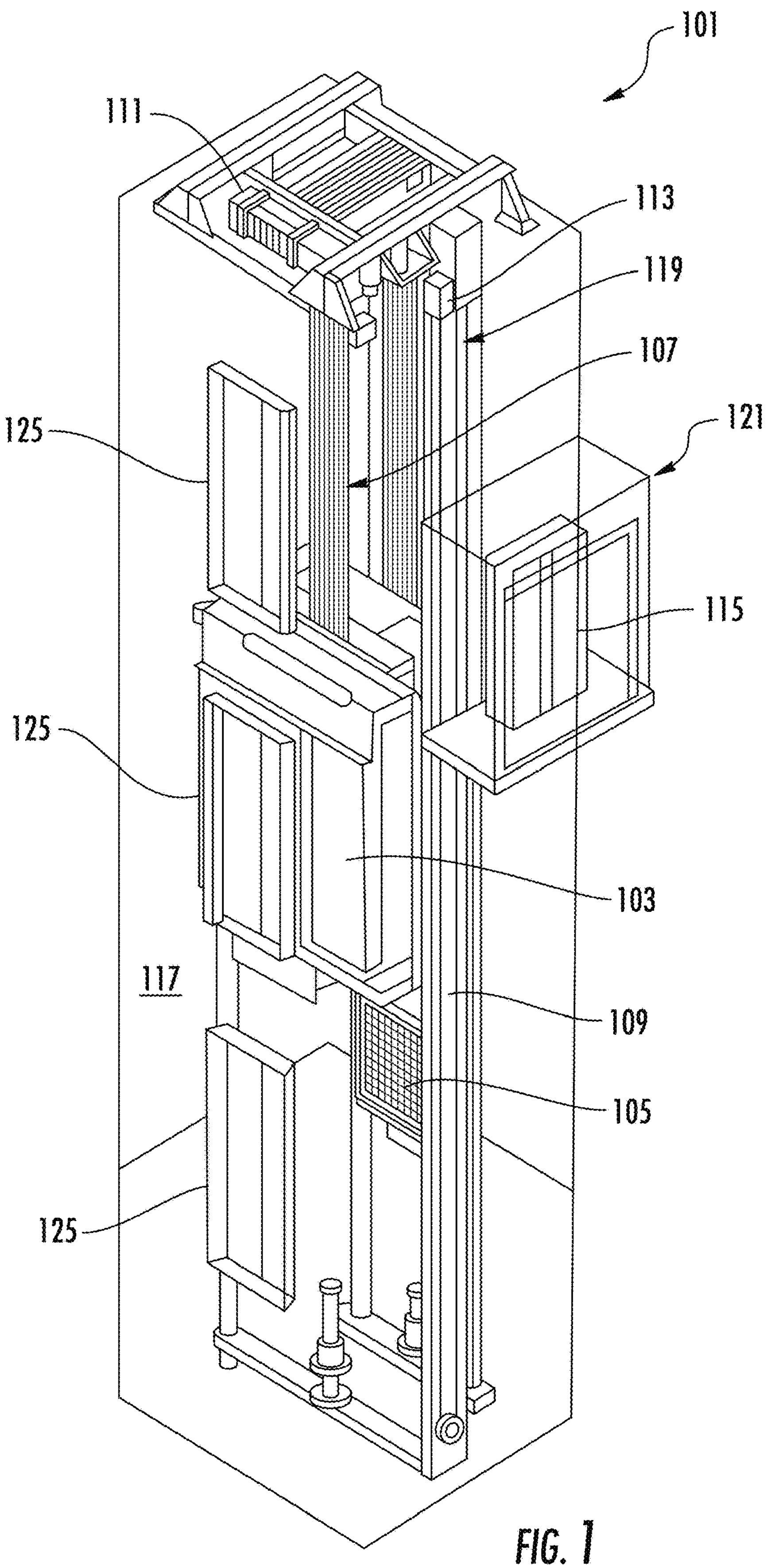
FIG. 1 is a schematic illustration of an elevator system that may employ various embodiments of the present disclosure.

FIG. 1 is a perspective view of an elevator system 101 including an elevator car 103, a counterweight 105, a roping 107, a guide rail 109, a machine 111, a position encoder 113, and an elevator controller 115. The elevator car 103 and counterweight 105 are connected to each other by the roping 107. The roping 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The roping 107 engages the machine 111, which, in this illustrative embodiment, is part of an overhead structure of the elevator system 101, although other arrangements are possible without departing from the scope of the present disclosure. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The elevator controller 115 is located, as shown in the illustrative arrangement, in a controller room 121 of the elevator shaft 117 and is configured to control the operation of the elevator system 101, and particularly the elevator car 103. In other embodiments the controller 115 can be located in other locations, including, but not limited to, fixed to a landing or landing door or located in a cabinet at a landing. The elevator controller 115 may provide drive signals to the machine 111 to control the acceleration, deceleration, leveling, stopping, etc. of the elevator car 103. The elevator controller 115 may also be configured to receive position signals from the position encoder 113. When moving up or down within the elevator shaft 117 along guide rail 109, the elevator car 103 may stop at one or more landings 125 as controlled by the elevator controller 115. Although shown in a controller room 121, those of skill in the art will appreciate that the elevator controller 115 can be located and/or configured in other locations or positions within the elevator system 101.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. Although shown and described with a roping system, elevator systems that employ other methods and mechanisms of moving an elevator car within an elevator shaft may employ embodiments of the present disclosure. FIG. 1 is merely a non-limiting example presented for illustrative and explanatory purposes.

Figure 2:
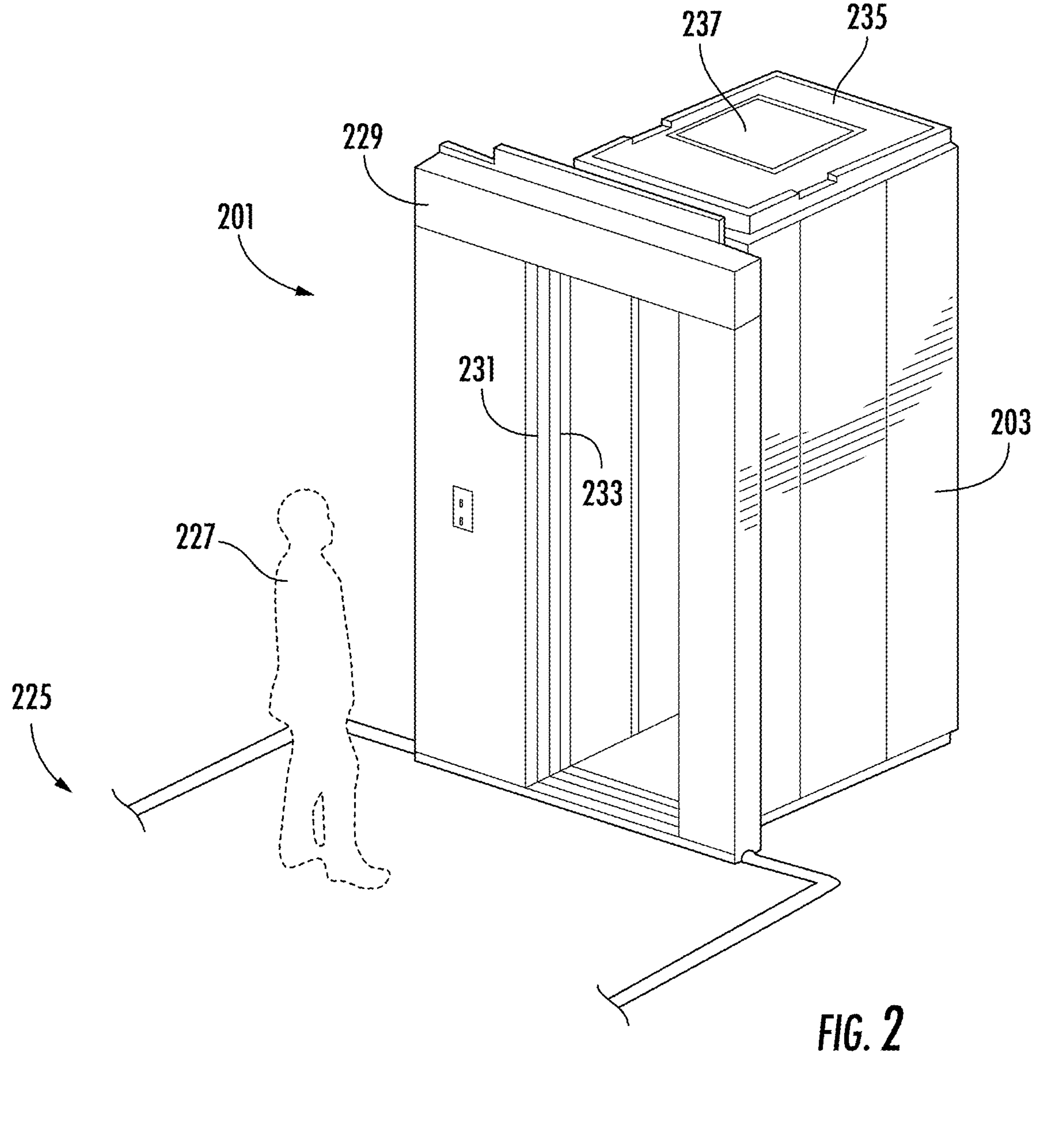
FIG. 2 is a schematic illustration of a landing door of an elevator system that may employ various embodiments of the present disclosure.

FIG. 2 is a schematic illustration of an elevator system 201 that may incorporate embodiments disclosed herein. As shown in FIG. 2, an elevator car 203 is located at a landing 225. The elevator car 203 may be called to the landing 225 by a user 227 (e.g., passenger or mechanic) that desires to travel to another floor within a building or perform maintenance on a portion of the elevator system 201. A car door lintel 229 of the elevator system 201 can include a door opening system or door operator to enable opening and closing of car doors 231 and landing doors 233 when the elevator car 203 is located at the landing 225. At times, such as during maintenance operations, a mechanic 227 may need to access an elevator car top 235 through a ceiling access panel 237.

In conventional systems, the mechanic 227 may be required to bring a step ladder and/or other equipment into the elevator car 203, in order to reach the ceiling and thus open the ceiling access panel 237. This requires additional equipment to be carried by the mechanic. Embodiments provided herein are directed to improved systems for accessing, opening, and operating ceiling access panels and providing access to an elevator car top. In some elevator configurations, the elevator cars/cabs may be limited to no greater than 2.3 m tall. For elevator cars/cabs that are taller than 2.3 m, it may be difficult for a mechanic to reach the ceiling access panel, in addition to suffering from other drawbacks, such as safety concerns or the like. In order to reduce the risks to a mechanic and to allow for relatively easy access to operation of a ceiling access panel within an elevator car, embodiments of the present disclosure are directed to a raisable platform and thus provide access to a ceiling or top of the elevator car.

Turning now to FIGS. 3A-3E, schematic illustrations of an elevator car 300 having a ceiling access system 302 are shown. The elevator car 300 may be configured similar to that shown and described above for operation within an elevator shaft. The ceiling access system 302 is configured within the elevator car 300, thus eliminating the need for a user (e.g., mechanic, etc.) to carry a ladder or similar equipment when needing to access the top of the elevator car 300. The ceiling access system 302 includes a movable platform 304. The movable platform 304 is a floor panel or panels that are normally maintained to define a floor of the elevator car 300. However, during a maintenance operation or the like, the movable platform 304 may be operated to move upward toward a ceiling panel assembly 306.

The elevator car 300 includes an elevator frame that includes a base 308, a top 310, and a number of vertical frame members 312 that extend between the base 308 and the top 310, as will be appreciated by those of skill in the art. Mounted or otherwise attached to the elevator frame are a set of wall panels 314 that define a passenger cab 316 of the elevator car 300. The wall panels 314 may be non-structural panels attached to the frame members 312 and/or the top 310 and the base 308. The passenger cab 316 is defined between a top/interior surface (e.g., floor) of the movable platform 304 and a bottom/interior surface of the top 310 of the elevator car 300, including an interior surface of the ceiling panel assembly 306. Not shown in FIGS. 3A-3E are an elevator car door or an additional third wall panel.

Figure 3A:
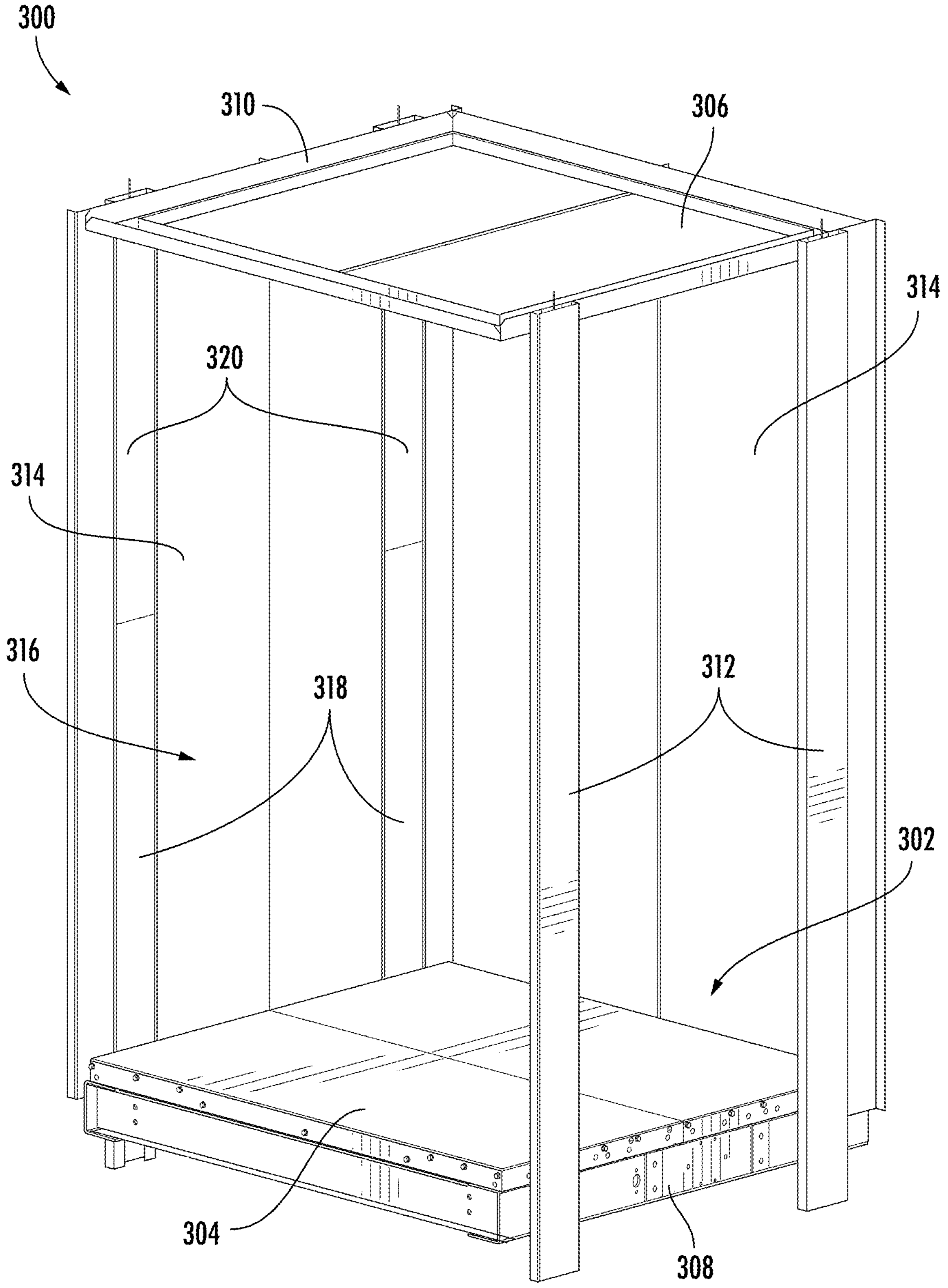
FIG. 3A is a schematic illustration of an elevator car having an elevator ceiling panel access system in accordance with an embodiment of the present disclosure.

When a user requires access to the ceiling panel assembly 306, such as to access components located within an elevator shaft outside of the passenger cab 316 and/or on the top 310 of the elevator car 300, the movable platform 304 may be caused to move upward toward the top 310 of the elevator and thus toward the ceiling panel assembly 306. The movable platform 304 is configured to travel along the vertical frame members 312. In a normal operation mode, such as shown in FIG. 3A, the interior portions of the vertical frame members 312 that face the passenger cab 316 are hidden behind lower frame covers 318 and upper frame covers 320. The frame covers 318, 320 are aesthetic cover plates or the like which hide the vertical frame members 312 from view and interaction by passengers within the passenger cab 316. To permit the movable platform 304 to move vertically along the vertical frame members 312, the lower frame covers 318 may be removed, as shown in FIG. 3B, thereby exposing the vertical frame members 312. The user will be located within the passenger cab 316 and the elevator car doors may be closed. The user can change the mode of operation of the elevator car 300 into a maintenance mode of operation or the like. In this mode of operation, the user is able to control operation and movement of the movable platform 304. The operation of the movable platform 304 is performed while the user is standing on the movable platform 304 within the passenger cab 316 of the elevator car.

With the lower frame covers 318 removed, a channel 322 defined within each of the vertical frame members 312 is exposed. The movable platform 304 is configured to travel along the channel 322 with movable supports 324 that are arranged within the channels 322. The channels 322 may have a C-shape in cross-section and the movable supports 324 may be configured as trucks, sleds, or the like that fit within and are movable along/within the channel 322 of the vertical frame members 312. The user can control operation of the movable platform 304 to travel vertically along the channel 322.

Figure 3C:
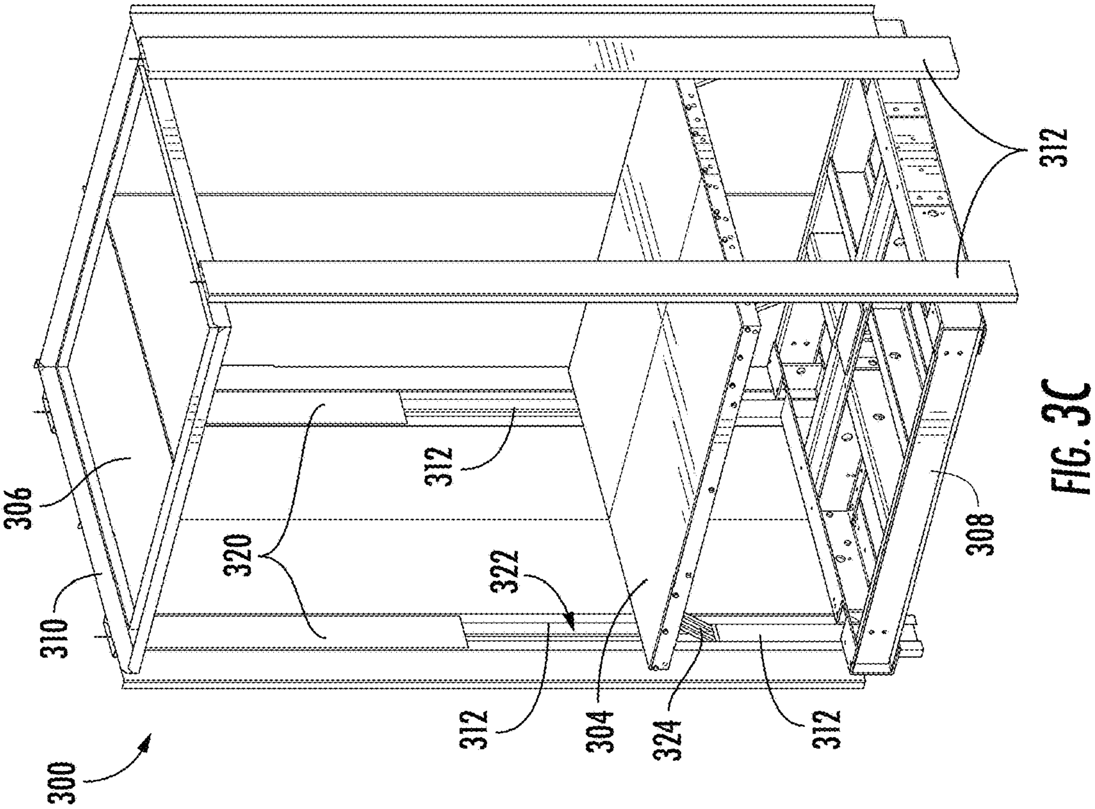
FIG. 3C is an illustration of a movable platform of the ceiling panel access system of FIG. 3A shown in an intermediate position and state of operation.
Figure 3B:
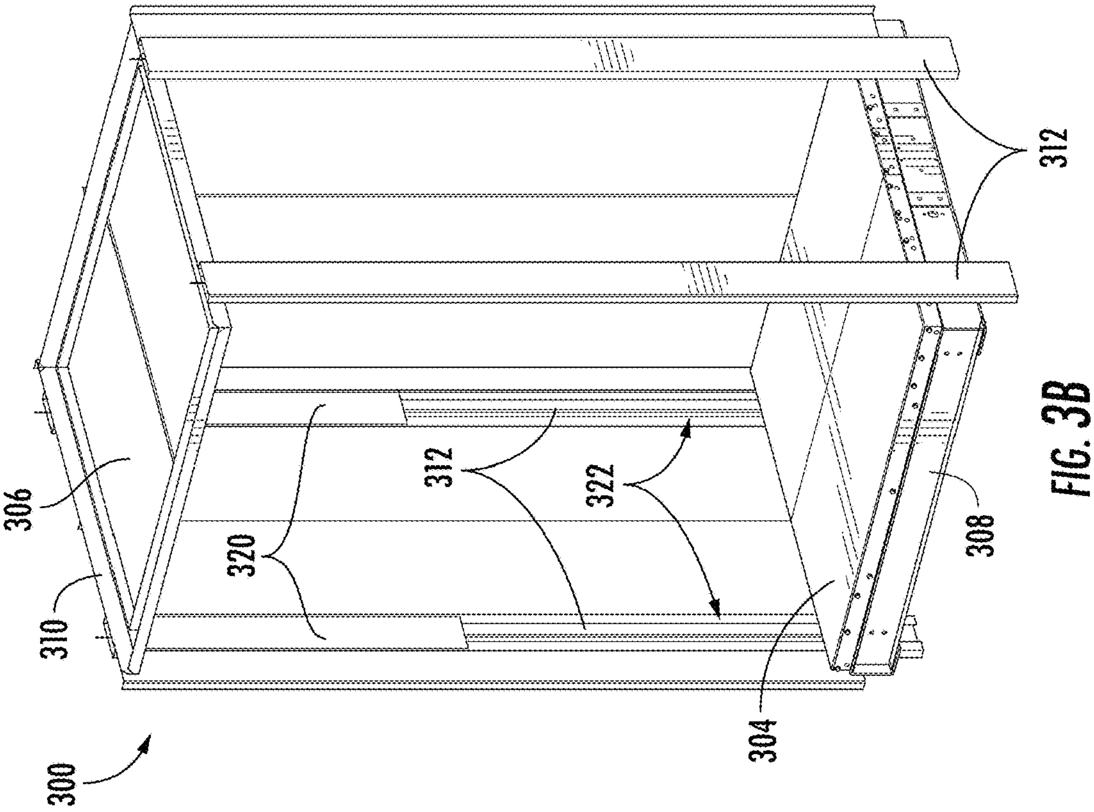
FIG. 3B is an illustration of the elevator car of FIG. 3A showing an initial state of operation, exposing a portion of the ceiling panel access system.

As shown in FIG. 3C, the movable platform 304 may be moved vertically upward relative to the base 308 and the top 310 of the elevator car 300. FIG. 3C illustrates an intermediate position of the movable platform 304 within the elevator car 300. In the intermediate position, when a user is standing on the movable platform 304, the user is now brought closer to the top 310 of the elevator car 300. The movable platform 304 may be configured to lock or secure into the intermediate position, and support the user on the movable platform 304. The user may then be able to reach and open the ceiling panel assembly 306.

Figure 3E:
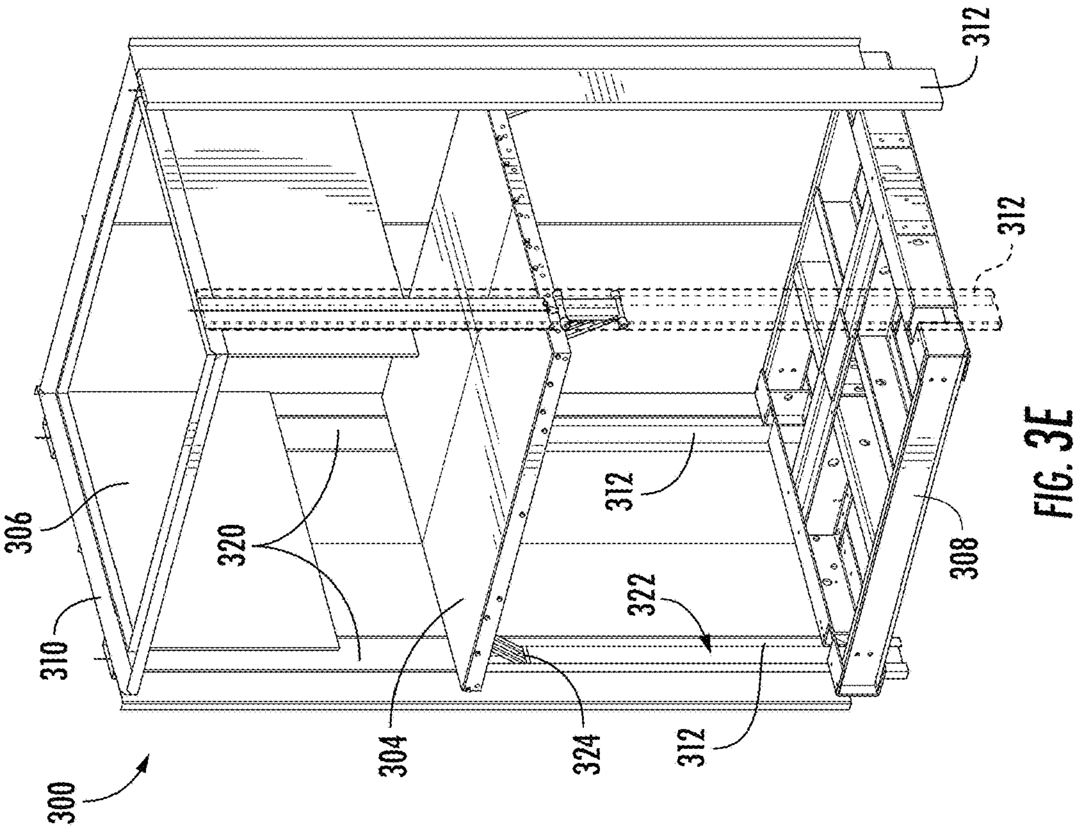
FIG. 3E illustrates the movable platform moved into a maximum vertical position.
Figure 3D:
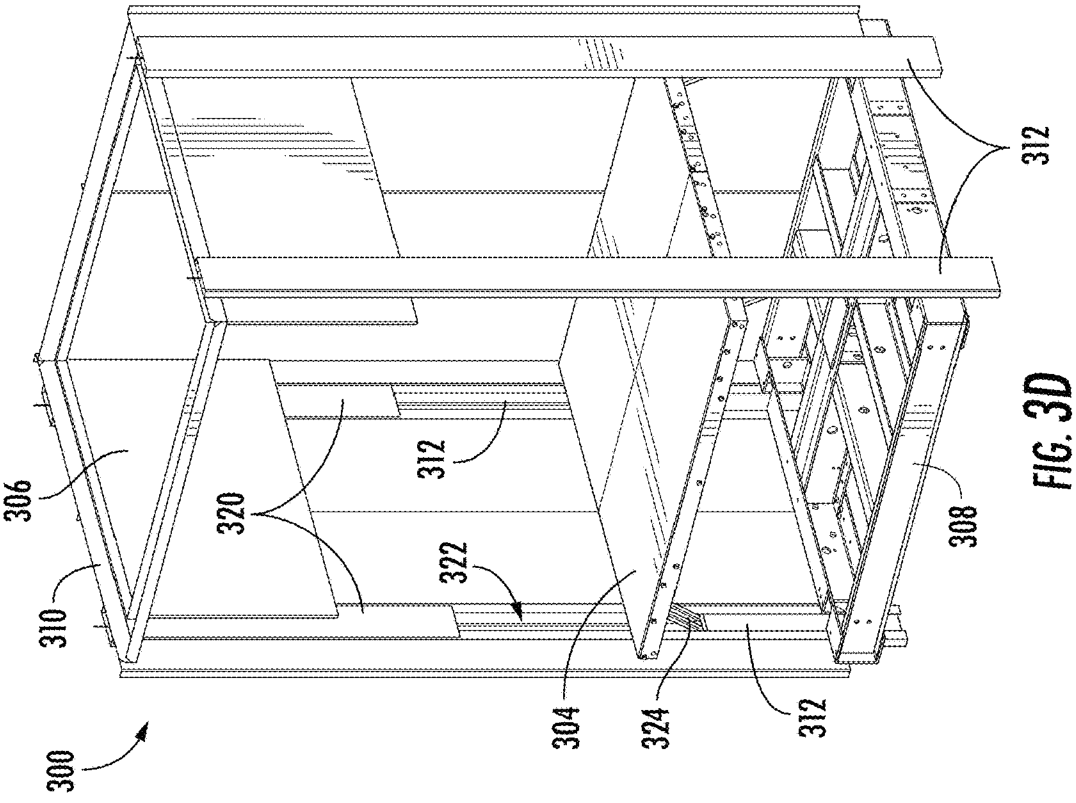
FIG. 3D illustrates the movable platform in the intermediate position with an elevator ceiling panel opened.

For example, as shown in FIG. 3D, the movable platform 304 is in the intermediate position, and the ceiling panel assembly 306 is opened. The user now has access to the opening defined by the ceiling panel assembly 306 and can potentially reach systems and components that are on the top 310 of the elevator car 300. However, if further vertical movement is necessary, the movable platform may be further raised beyond the intermediate position (FIGS. 3C-3D).

As shown in FIG. 3E, the movable platform 304 is moved to a maximum vertical position which has the movable platform 304 raised to a maximum vertical height within the elevator car 300. In accordance with some embodiments, the upper frame covers 320 may be configured to operate as a stop to prevent further vertical movement of the movable supports 324. In other configurations, other stopping means and/or mechanisms may be provided (e.g., plate or end stop arranged within one or more of the channels 322). At the maximum vertical position, a user on the movable platform 304 may have full access at the top 310 of the elevator car 300 and may be able to perform maintenance or the like on systems and/or components arranged on top of and/or above the elevator car 300 and/or located within an elevator shaft.

Once a user has completed their task, they may then perform the reverse operation. For example, the movable platform 304 may be moved from the maximum vertical position (FIG. 3E) downward to the intermediate position (FIG. 3D). The user may then close the ceiling panel assembly 306 (FIG. 3C). Next, the movable platform 304 is moved back to the initial position or normal operating position, where the movable platform 304 defines a floor of the elevator car 300. The user may then replace the lower frame covers 318 and switch the elevator car 300 out of maintenance mode, to return the elevator car 300 to the normal operating state.

Figure 4:
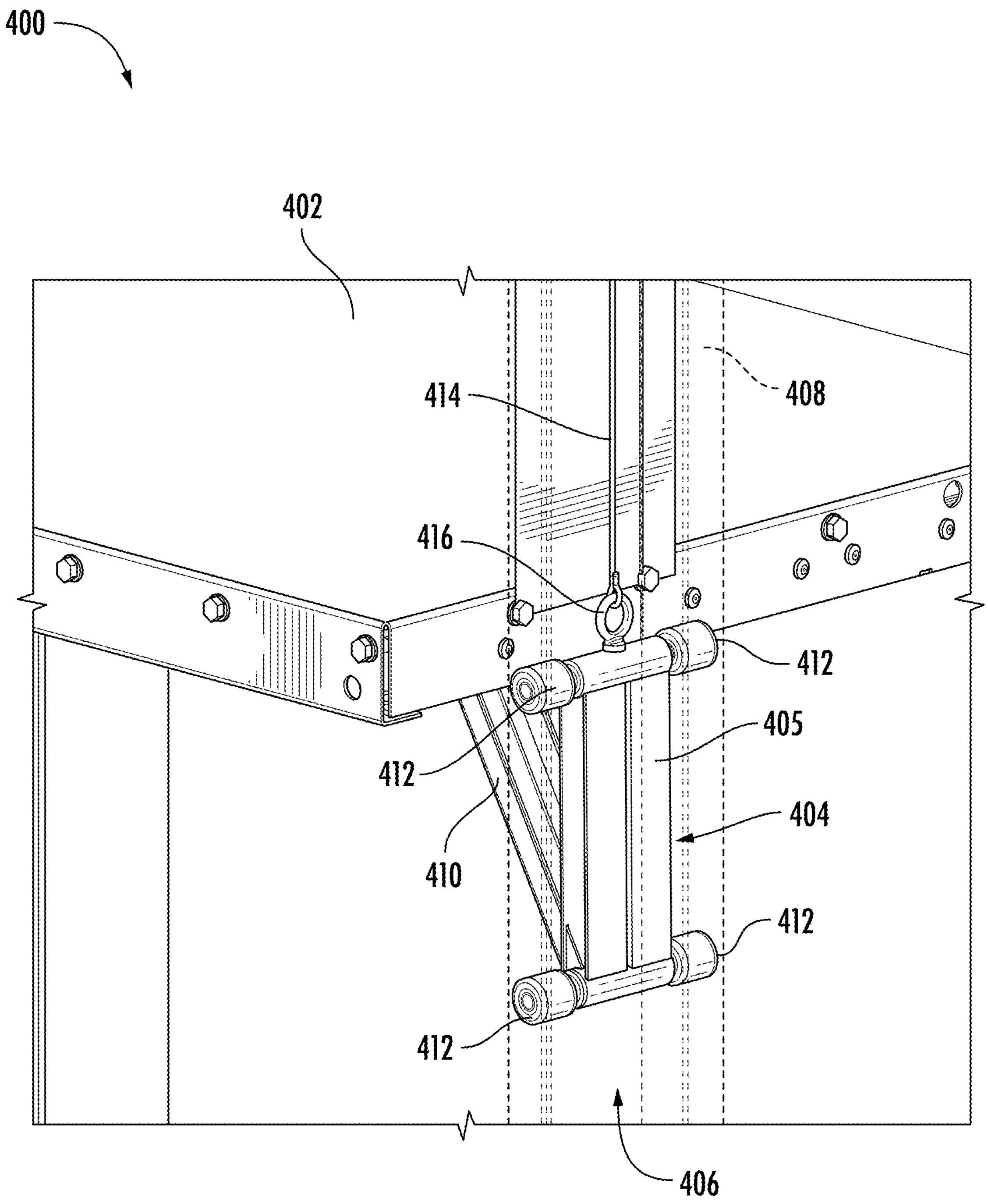
FIG. 4 is a schematic illustration of a portion of an elevator car in accordance with an embodiment of the present disclosure.

Referring now to FIG. 4, a schematic illustration of a portion of an elevator car 400 configured to a movable platform 402 in accordance with an embodiment of the present disclosure is shown. FIG. 4 illustrates an enlarged detail view of a movable support 404 arranged within a channel 406 of a vertical frame member 408. In this illustrative configuration, the movable support 404 includes a support body 405 that is operably connected to the movable platform 402 by a support bracket 410 and is configured to move along the channel 406 by means of a set of wheels 412. The movable support 404 may be caused to move or travel along and within the channel 406 by a drive cable 414 which attaches to the movable support 404 at a connector 416.

Figure 5:
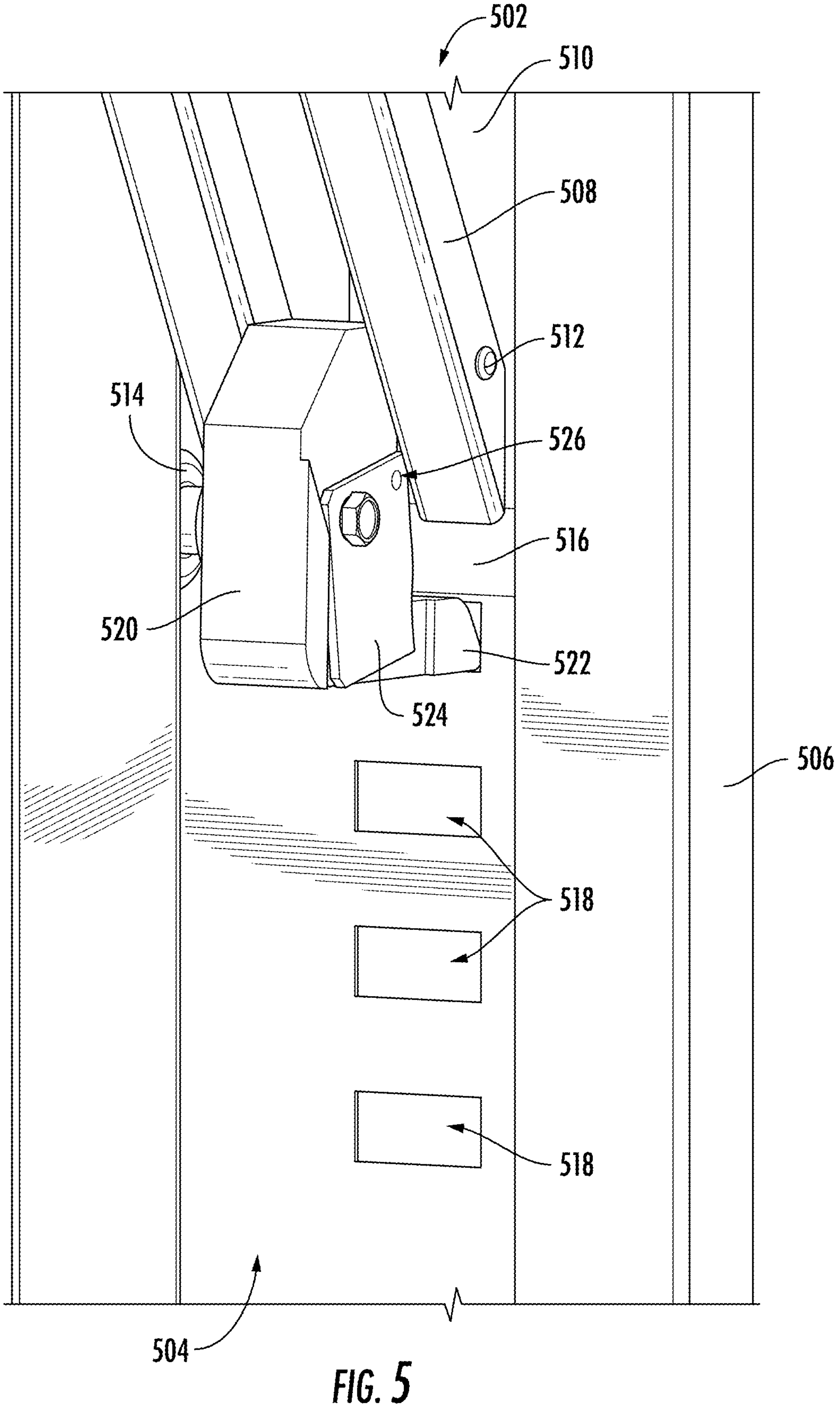
FIG. 5 is a schematic illustration of a portion of a movable platform assembly in accordance with an embodiment of the present disclosure.

Referring now to FIG. 5, schematic illustrations of a portion of a movable platform assembly 500 in accordance with an embodiment of the present disclosure is shown. The movable platform assembly 500 may include a movable platform that is supported on one or more movable supports 502, similar to that shown and described above. As illustrated in FIG. 5, the movable support 502 is configured to travel along a channel 504 defined within a vertical support member 506. The vertical support member 506 may be a part of a support frame of an elevator car or a dedicated element configured as part of an elevator car.

The movable support 502 includes a support bracket 508 that is pivotably attached to a movable base 510 by a pivot pin 512. The movable support 502 includes a set of wheels 514 that are arranged to fit within the channel 504 defined by the vertical support member 506 and travel within and along the channel 504. The channel 504 may be defined by a C-shaped cross-section of the vertical support member 506. The wheels 514 are mounted on a shaft 516 that permits free rotation of the wheels 514 along the interior surfaces of the vertical support member 506 that define the channel 504.

The vertical support member 506 is configured with a set of locking apertures 518 that are distributed along the vertical length of the channel 504. The movable support 502 includes a locking wedge 520 that includes a locking extension 522 for releasably engaging the locking apertures 518. As the movable support 502 moves upward along the channel 504, the locking extension 522 may selectively engage with each locking aperture 518. When the locking extension 522 is engaged with a locking aperture 518, the movable support 502 may be secured and held in place. The locking extension 522 may have an angled surface at an end thereof such that upward movement causes the locking extension 522 to disengage with a given locking aperture 518 and to move upward along a solid surface of the vertical support member 506. When the locking extension 522 aligns with the next locking aperture 518, the locking extension 522 will engage with such locking aperture 518.

The movable support 502 is configured to allow downward movement without interactions with the locking apertures 518. For example, as shown in FIG. 5, the movable support 502 may include a release plate 524 which is selectively and removably secured to the locking wedge 520 by a locking pin 526. The release plate 524 may be rotated into a position such that the locking wedge 520 is moved and the locking extension 522 is removed from engagement with a locking aperture 518. In this state, the movable support 502 may travel downward within the channel 504 without the locking extensions 522 interfering with the vertical movement thereof. Accordingly, the movable support 502, in this configuration, is configured with a ratchet-type mechanism having a tooth-like feature that can move into and out of engagement with the locking apertures 518.

Figure 6:
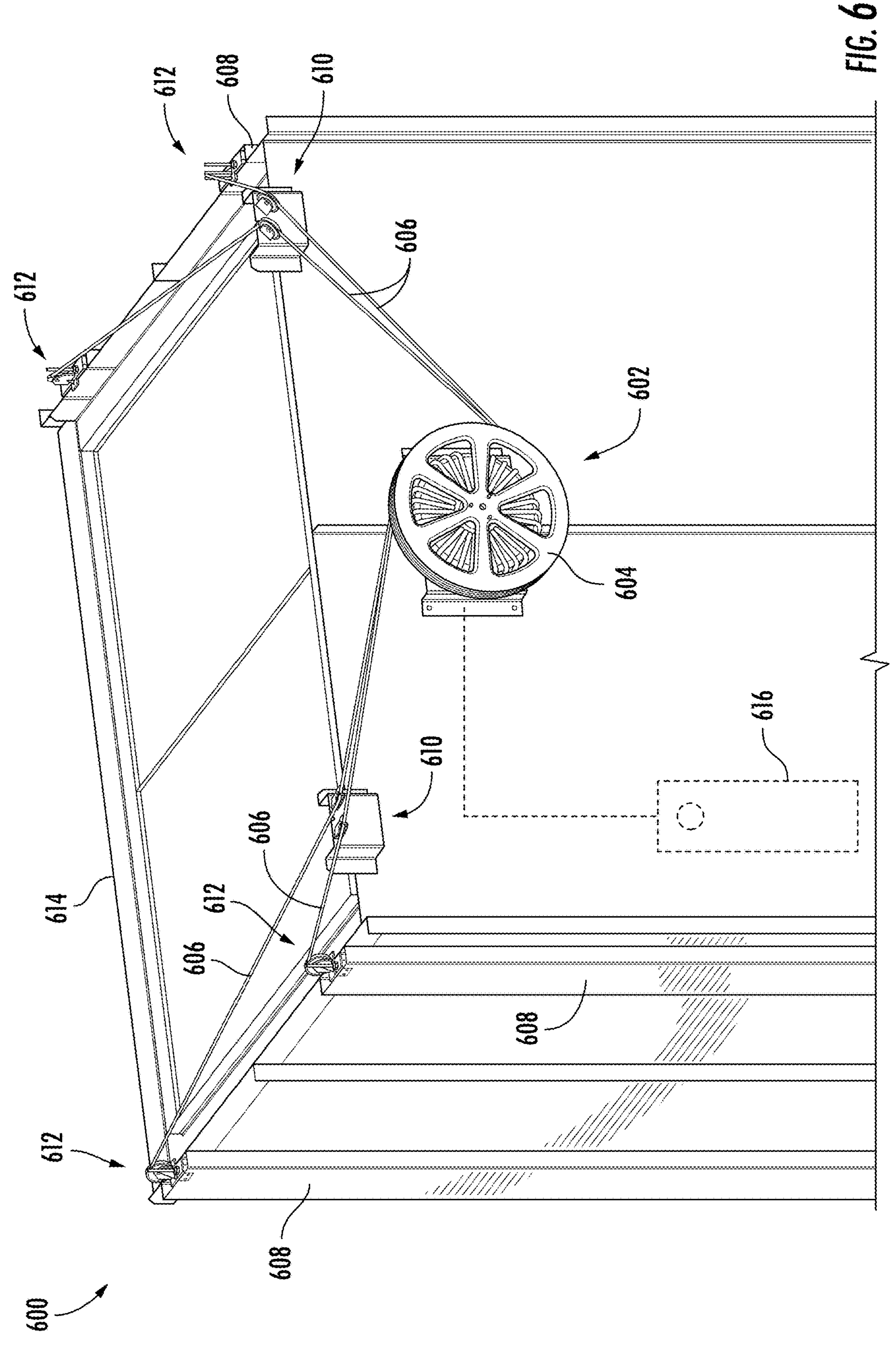
FIG. 6 is a schematic illustration of an elevator car configured with a ceiling panel access system in accordance with an embodiment of the present disclosure.

Referring now to FIG. 6, a schematic illustration of an elevator car 600 having a ceiling access system 602 is shown. The elevator car 600 may be configured similar to that shown and described above for operation within an elevator shaft. The ceiling access system 602 is similar to that shown and described above, having a movable platform provided within the elevator car 600. FIG. 6 illustrates an example mechanism for controlling movement and operation of the movable platform. As shown, a drive mechanism 604 is arranged on an exterior of the elevator car 600. The drive mechanism 604 may be affixed to an elevator structural frame, external panels, or otherwise attached to the elevator car 600. In this configuration, the drive mechanism 604 is affixed to a side of the elevator car 600.

As shown, the drive mechanism 604 is a wheel or spool which is operably connected to a set of drive cables 606. Each drive cable 606 connects the drive mechanism 604 to a respective movable support (e.g., as shown in FIG. 4). The movable supports are configured to travel within and along respective vertical frame members 608. The drive cables 606 extend from the drive mechanism 604 and are turned and oriented through one or more sets of turning pulleys 610, 612. A first set of turning pulleys 610 transition the drive cables 606 from extending along the side of the elevator car 600 to travel along a top 614 of the elevator car 600. A second set of turning pulleys 612 are arranged to direct each of the drive cables 606 vertically into respective vertical frame members 608, where the drive cables 606 connect to respective movable supports. The movable supports are arranged to connect to and support a movable platform, as shown and described above. As the drive mechanism 604 is rotated, the drive cables 606 may be wound about the drive mechanism 604 to cause the length of the drive cables 606 to shorten and thereby pull the movable supports along the vertical frame members 608.

The operation of the drive mechanism 604 may be manual or electrical. For example, in some embodiments, the drive mechanism 604 may include an electric motor or the like. A user located inside the elevator car 600 may operate a control panel 616 which sends a signal to the drive mechanism 604 to cause operation thereof. The control panel 616 may be part of a car operating panel or the like, as will be appreciated by those of skill in the art. In some other configurations, a wired or wireless controller may be connected to a car operating panel or similar electronics of the elevator car to control operation of the drive mechanism. In some configurations, as noted, the operation of the drive mechanism 604 may be manual. In such configurations, the drive mechanism may include a hand crank that may selectively connect from the inside of the elevator car, and then may be manually rotated to cause rotation of the drive mechanism. In some configurations, a hand power tool, such as a drill or the like, may be configured to engage with a part of the drive mechanism to drive rotation thereof.

Figure 7:
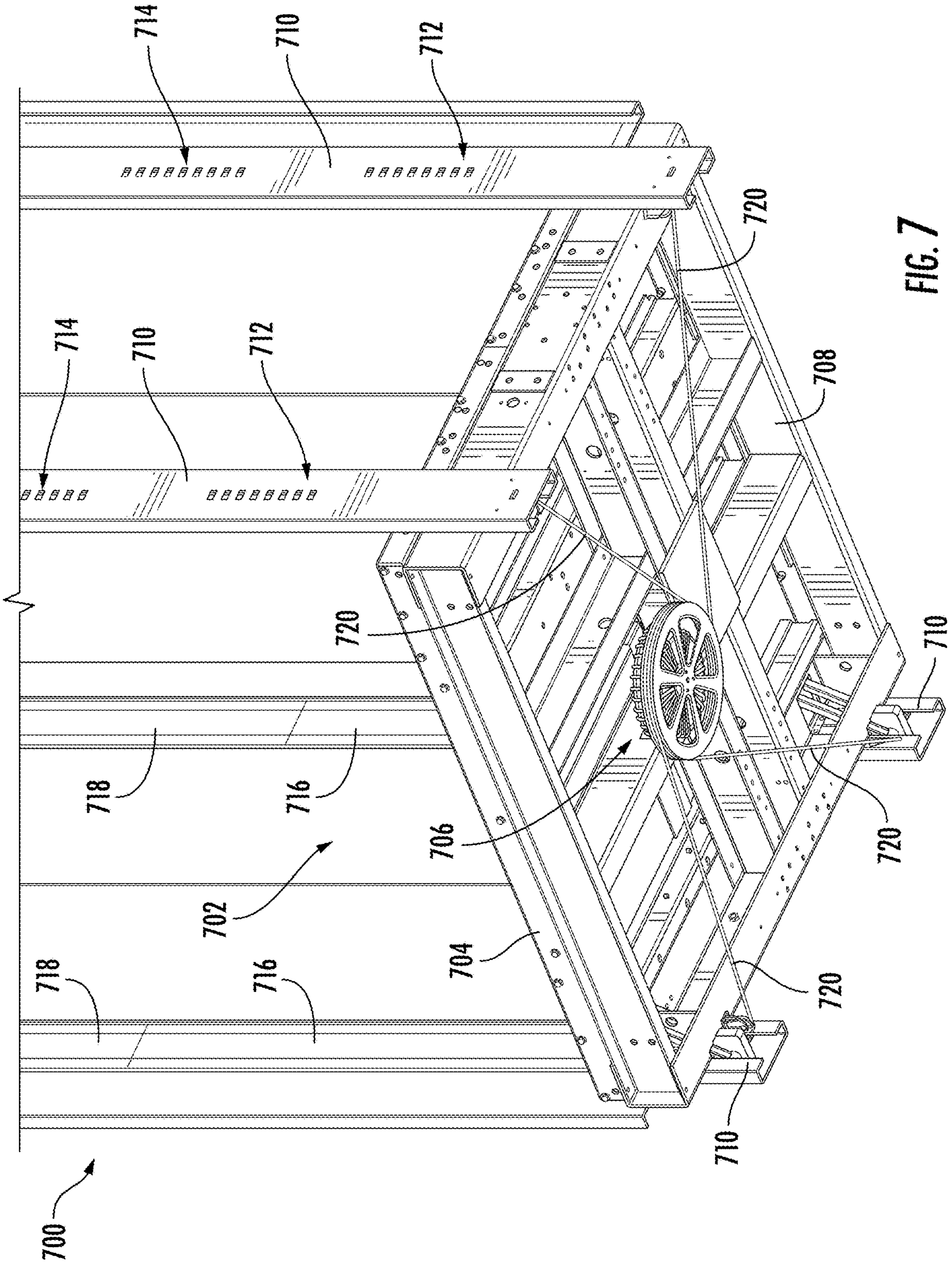
FIG. 7 is a schematic illustration of an elevator car configured with a ceiling panel access system in accordance with another embodiment of the present disclosure.

Referring now to FIG. 7, a schematic illustration of an elevator car 700 having a ceiling access system 702 is shown. The elevator car 700 may be configured similar to that shown and described above for operation within an elevator shaft. The ceiling access system 702 is similar to that shown and described above, having a movable platform 704 provided within the elevator car 700. FIG. 7 illustrates an example mechanism for controlling movement and operation of the movable platform 704. As shown, a drive mechanism 706 is arranged on an exterior of the elevator car 700. The drive mechanism 706, in this configuration, is affixed to an elevator structural frame 708 on the bottom of the elevator car 700.

As shown and described above, the movable platform 704 is mounted and movable using four movable supports, arranged within four respective vertical frame members 710. Although shown with four vertical frame members 710 which include respective movable supports, the number of components is not intended to be limiting. That is, in accordance with some embodiments, more than four or fewer than four movable supports may be provided within an equal number of vertical frame member and/or multiple movable supports may be arranged within a single channel of a single vertical frame member, depending on the specific implementation. For example, in some embodiments, only one or two movable supports may be required, and the movable platform may be cantilevered on one side. It will be appreciated that four (or more) movable supports may allow for higher weight capacity load carrying of the movable platform and configurations with a cantilever configuration.

As shown, the vertical frame members 710 may include sets of locking apertures 712, 714. The sets of locking apertures 712, 714 may provide stop positions for the movable platform 704 as it travels vertically within the elevator car 700. A lower set of locking apertures 712 may be used by a user for stopping and securing the movable platform 704 at one or more intermediate positions (heights). In the intermediate position, at one of the locking apertures of the lower set of locking apertures, a user may be able to reach and open a ceiling panel or the like of the elevator car 700. Once the ceiling panel is opening, the user may then cause further vertical movement of the movable platform 704 to travel upward to engage and lock into position with a locking aperture of the upper set of locking apertures 714. The upper set of locking apertures 714 define a maintenance position in which a user on the movable platform 704 can reach components above and/or on top of the elevator car 700. The highest locking aperture of the upper set of locking apertures 714 defines the maximum vertical position of the movable platform 704.

As shown in FIG. 7, the vertical frame members 710 may include frame covers 716, 718. The frame covers 716, 718 may be aesthetic cover plates or the like which hide the vertical frame members 710 from view and interaction by passengers within the elevator car 700. To permit the movable platform 704 to move vertically along the vertical frame members 710, the lower frame covers 716 may be removed. The upper frame covers 718 may be removable or fixed. In some configurations, the upper frame covers 718 may be provided to ensure that the movable platform 704 does not exceed an intended maximum vertical position.

In this illustrative configuration, the drive mechanism 706 is a wheel or spool which is operably connected to a set of drive cables 720. Each drive cable 720 connects the drive mechanism 706 to a respective movable support (e.g., as shown in FIG. 4). The movable supports are configured to travel within and along respective vertical frame members 710. The drive cables 720 extend from the drive mechanism 706 and are turned and oriented through one or more sets of turning pulleys, similar to that shown and described above. The movable supports are arranged to connect to and support the movable platform 704. As the drive mechanism 706 is rotated or otherwise operated, the drive cables 720 may be wound about the drive mechanism 706 to cause the length of the drive cables 720 to shorten and thereby pull the movable supports along the vertical frame members 710. The movable supports may include locking wedges or the like for engagement with the locking apertures 712, 714.

The operation of the drive mechanism 706 may be manual or electrical. For example, in some embodiments, the drive mechanism 706 may include an electric motor or the like. A user located inside the elevator car 700 may operate a control panel or control device (e.g., plug-in or wireless controller) which sends a signal to the drive mechanism 706 to cause operation thereof. In some embodiments, the control panel or control device may be part of a car operating panel or the like. In other configurations, a wired or wireless controller may be connected to a car operating panel or similar electronics of the elevator car 700 to control operation of the drive mechanism 706.

As shown and described herein, the movable platforms are carried by movable supports arranged within the vertical frame members of the elevator car. The movable supports are driven along the channels of the vertical frame members by a cable system. It will be appreciated that other types of driving and movement mechanisms can be employed without departing from the scope of the present disclosure. For example, in some configurations the movable platforms may be mounted to and affixed to a piston system, which would replace the cable system. Such a piston system may be arranged substantially similar to that shown and described above, with the piston shafts being arranged at the sides and may be arranged within similar vertical frame members. In some configurations of a piston arrangement, the driving piston may be centrally located below the movable platform, and at the edges simple supports may be provided to ensure balance and stability (e.g., similar to the movable supports of the cable-system version). Accordingly, it will be appreciated that the specific illustrated configurations are not intended to be limiting, but rather are provided for illustrative and explanatory purposes.

In accordance with embodiments of the present disclosure, systems and mechanisms for accessing an elevator ceiling access panel and gaining access to a top of an elevator car are provided. The ceiling panel access systems described herein provide for a movable platform within an elevator car that can raise and lower to bring a user closer to an elevator ceiling panel and thus gain access thereto. The movable platform is a modified floor of the elevator car that is mounted on one or more movable supports that travel vertically along respective vertical frame members. The movable platform is movably driven by a drive mechanism that can be manually or remotely operated (e.g., electrically). In normal operation, the components of the ceiling panel access systems are not visible to a passenger. The movable platform is the elevator car floor, and thus is not readily visible as a maintenance component of the elevator car. Further, the vertical frame members may be part of the elevator car and can be covered by frame covers or the like. The operational components may be integrated into a car operating panel or may be hidden behind covers or the like. As such, the maintenance features described herein do not impact the aesthetics of the interior of the elevator car.

Advantageously, in accordance with some embodiments, the movable platform may be operated from a position within the elevator car, and at a comfortable position to the user (e.g., on a car operating panel, or at a location on a side wall panel). A user can remotely or directly cause rotation of a drive mechanism to cause cables to be wound about the drive mechanism and pull upward on the movable platform. The pulling force will cause a locking wedge to disengage from a secure engagement with a vertical frame member and a movable support may travel up the vertical frame member. The vertical frame member may be provided with locking apertures to ensure that the movable platform does not fall downward unexpectedly. The locking apertures may also provide stopping points in the vertical motion of the movable platform to allow a user to stop the movable platform (such as at an intermediate position) and gain access to open a ceiling panel or the like. Accordingly, embodiments of the present disclosure provide for improved access to ceiling panels and/or working platforms to allow for access to a top of an elevator car from the interior thereof.

Advantageously, embodiments of the present disclosure make for access of a ceiling of an elevator car safer and easier for the user. For example, the user (e.g., mechanic) will not need a ladder or other device to gain access to the ceiling. Further, the tools necessary to control operation of the movable platform may be present within the elevator car, such as on a car operating panel or the like. As such, the number of tools and equipment that a user needs to bring to the elevator car to perform maintenance may be reduced.

As used herein, the use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity).

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator car comprising:

a movable platform defining an elevator car floor;

a ceiling access panel located in a ceiling of the elevator car; and a ceiling panel access system comprising:

at least one movable support arranged within a vertical frame member, wherein the at least one movable support is connected to the movable platform and arranged to move the movable platform vertically within the elevator car;

a removable frame cover configured to cover the vertical frame member and defining a lower frame cover covering a lower portion of the vertical frame member; and an upper frame cover arranged to cover an upper portion of the vertical frame member, wherein the upper frame cover defines a stop to prevent vertical movement of the movable platform beyond a maximum vertical position defined by a lower end of the upper frame cover.

2. The elevator car of claim 1, wherein the at least one movable support is four movable supports.

3. The elevator car of claim 1, wherein the at least one movable support comprises:

a support body;

a set of wheels attached to the support body; and a support bracket configured to connect the movable platform to the support body.

4. The elevator car of claim 1, wherein:

the vertical frame member comprises one or more locking apertures; and the at least one movable support comprises a locking wedge configured to selectively engage with the one or more locking apertures.

5. The elevator car of claim 4, wherein the one or more locking apertures are arranged to define at least a maximum vertical position of the movable platform within the elevator car and at least one intermediate position that is at a lower vertical position than the maximum vertical position.

6. The elevator car of claim 1, wherein the movable platform is supported in a cantilevered manner by the at least one movable support.

7. The elevator car of claim 1, wherein the movable platform is movable from a normal operating position wherein the movable platform defines the floor of the elevator car, an intermediate position wherein a user can reach and open the ceiling access panel, and a maximum vertical position wherein a person standing on the movable platform in the maximum vertical position can access a top of the elevator car.

8. The elevator car of claim 1, wherein the vertical frame member defines a channel along which the at least one movable support travels.

9. The elevator car of claim 1, further comprising a driving mechanism configured to drive movement of the movable platform between a normal operating position wherein the movable platform defines the floor of the elevator car and a maximum vertical position wherein a person standing on the movable platform in the maximum vertical position can access a top of the elevator car.

10. The elevator car of claim 9, wherein the driving mechanism is operably connected to the at least one movable support via a cable.

11. The elevator car of claim 9, wherein the driving mechanism is mounted to an exterior of the elevator car.

12. The elevator car of claim 11, wherein the driving mechanism is mounted to a side of the elevator car.

13. The elevator car of claim 11, wherein the driving mechanism is mounted to a bottom of the elevator car.

14. The elevator car of claim 9, wherein the driving mechanism is configured to be manually operated.

15. The elevator car of claim 9, wherein the driving mechanism comprises a motor.

16. The elevator car of claim 9, wherein the driving mechanism is configured to be operated via a car operating panel of the elevator car.

17. The elevator car of claim 9, wherein the ceiling panel access system comprises four movable supports arranged in four respective vertical frame members, and wherein the driving mechanism is configured to cause simultaneous movement of the four movable supports within the respective vertical frame members.

* * * * *